G. H. LANG.
SPEED INDICATOR.
APPLICATION FILED JUNE 22, 1910.

1,128,695.

Patented Feb. 16, 1915.
5 SHEETS—SHEET 1.

Witnesses.
Thomas Drummond.
Joseph M. Ward.

Inventor
George H. Lang,
by Kenly & Gregory att'ys

G. H. LANG.
SPEED INDICATOR.
APPLICATION FILED JUNE 22, 1910.

1,128,695.

Patented Feb. 16, 1915.
5 SHEETS—SHEET 2.

Witnesses.
Thomas J. Drummond.
Joseph M. Ward.

Inventor.
George H. Lang,
by Kenly & Guy, attys.

G. H. LANG.
SPEED INDICATOR.
APPLICATION FILED JUNE 22, 1910.

1,128,695.

Patented Feb. 16, 1915.

Witnesses.
Thomas J. Drummond
Joseph M. Ward.

Inventor.
George H. Lang,
by Lemly & Guyry attys.

G. H. LANG.
SPEED INDICATOR.
APPLICATION FILED JUNE 22, 1910.

1,128,695.

Patented Feb. 16, 1915.
5 SHEETS—SHEET 4.

Witnesses.
Thomas J. Drummond
Joseph M. Ward.

Inventor.
George H. Lang,
by Leuty & Gregory attys.

G. H. LANG.
SPEED INDICATOR.
APPLICATION FILED JUNE 22, 1910.

1,128,695.

Patented Feb. 16, 1915.
5 SHEETS—SHEET 5.

Witnesses.
Thomas J. Drummond.
Joseph M. Ward.

Inventor.
George H. Lang,
by Gerely Gregory Att'ys

UNITED STATES PATENT OFFICE.

GEORGE H. LANG, OF BOSTON, MASSACHUSETTS.

SPEED-INDICATOR.

1,128,695.  Specification of Letters Patent.  Patented Feb. 16, 1915.

Application filed June 22, 1910. Serial No. 568,252.

*To all whom it may concern:*

Be it known that I, GEORGE H. LANG, a citizen of the United States, residing at Boston, county of Suffolk, and State of Massachusetts, have invented an Improvement in Speed-Indicators, of which the following description, in connection with the accompanying drawing, is a specification, like characters on the drawing representing like parts.

This invention relates to speed indicators of that type wherein the indicating member is set at predetermined intervals to indicate the speed of the rotating member at the time when the indicating member is set.

The objects of the invention are to provide a novel speed indicator of this type which is simple in its construction and can be inexpensively manufactured; which will be accurate in its operation; and to otherwise improve speed indicators, all as will be more fully hereinafter described and then pointed out in the appended claims.

Referring to the drawings wherein I have illustrated one embodiment of my invention.

Speed indicators of the class to which this invention belongs usually comprise an indicating member which operates in conjunction with a scale or dial and which is provided with a spring tending normally to return it to zero position, a driving member which is driven forward at a speed corresponding to the speed of the device with which the speed indicator is to be used, an intermediate or positioning member which is adapted to be driven forward by the driving member and is adapted to drive or move the indicating member, and a spring to return the positioning member to its initial position. These parts are so arranged that when the device is set in operation the driving member will be clutched to and will drive the positioning member and the latter will drive the indicating member during the first interval of time, and at the end of said interval of time the indicating member is locked from backward rotation while the positioning member is unclutched from the driving member and returns to its initial position. During the second interval of time the positioning member is clutched to the driving member and is driven forward thereby, and at the end of said interval of time the indicating member is released and will assume a position determined by that of the positioning member, and after the indicating member is thus positioned, the positioning member will again return to its initial position to be again driven forward during the next interval of time. In this way the indicating member is set at the end of each interval of time to indicate the speed of the machine at such time.

My improved indicator has been especially designed for use in connection with automobiles for indicating the speed thereof, but it can equally well be used for indicating the speed of any other rotating or reciprocating part.

Figure 1:
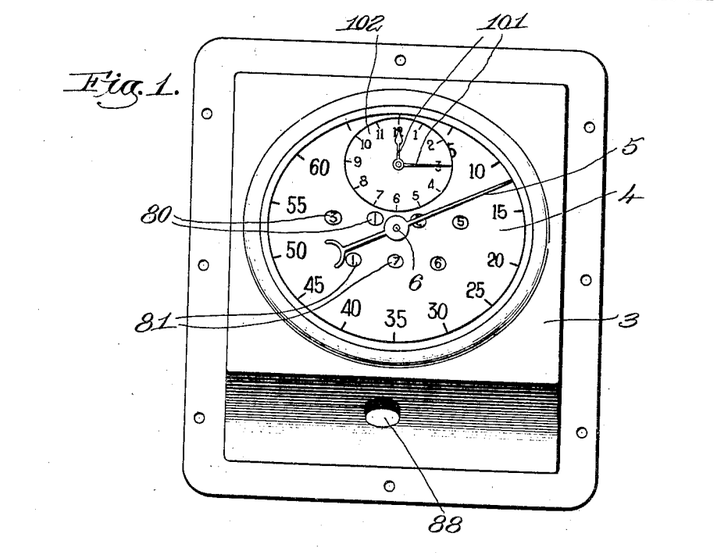
Figure 1 is a front view of an indicator which is especially designed for indicating the speed of automobiles, said view showing the indicator in its case which is constructed to be secured to the dash-board of the automobile.
Figure 2:
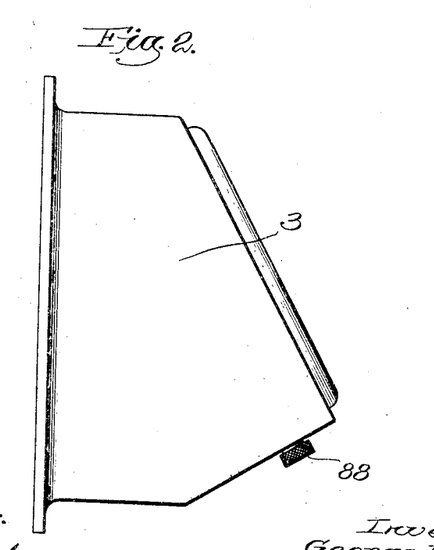
Fig. 2 is a side view of Fig. 1.

The mechanism of the device is so designed that it can be inclosed within a box or casing 3, see Figs. 1 and 2, which is especially adapted to be secured to the dash-board or instrument board of an automobile, and this casing is so shaped that the dial 4 over which the pointer passes will be inclined somewhat so as to make it easier to read. However, this particular form of casing is not essential to the invention.

Figure 5:
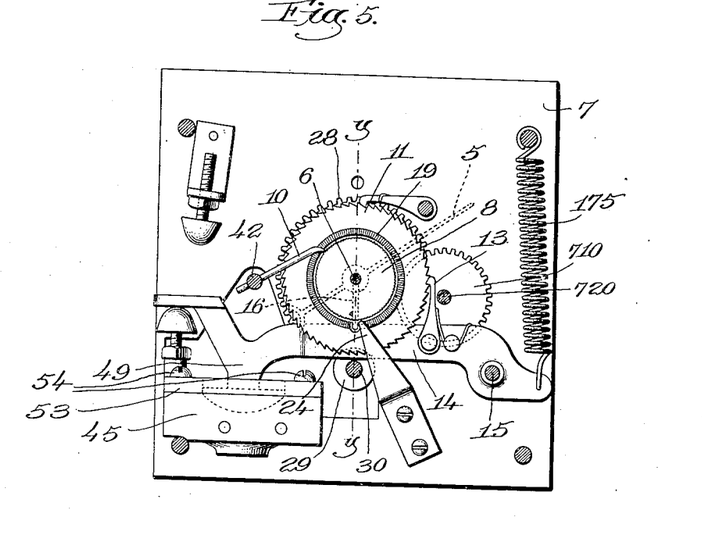
Fig. 5 is a section on substantially the line $x$—$x$, Fig. 7.
Figure 6:
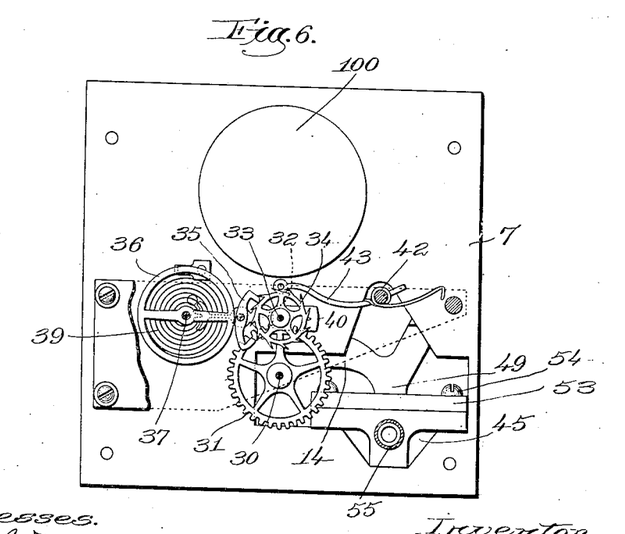
Fig. 6 is a back side view of the speed indicator with a part broken out to better show the timing mechanism.

The indicating member comprises a pointer 5 which is sustained by a shaft 6 that is suitably journaled in the frame 7 of the mechanism and has fast thereto a toothed wheel 8 by which the shaft 6 is driven forward. A spiral spring 9 tends normally to return the pointer to zero position. A pawl 10, see Fig. 5, coöperates with the toothed surface of the wheel 8 to normally prevent backward rotation thereof. The driving member is shown at 11 and it comprises a ratchet wheel loosely mounted on a stud 12 carried by the frame 7. This ratchet wheel is moved forward intermittently but always in the same direction by a pawl 13 carried by a lever 14 which is pivoted to the frame at 15 and which has a vibrating movement about the pivot 15 at a speed corresponding to the speed of the device with which the instrument is used. The means for vibrating this operating lever 14 will be more fully hereinafter described.

In the illustrated embodiment of my invention the intermediate or positioning member which transmits movement from the driving member to the indicating member is herein shown as an arm 16 which is provided with a stem 17 that extends axially through the stud 12 and is mounted to turn therein and it is driven from the driving member by mechanical means which are operative in any relative position of the driving member and positioning member to establish a positive driving connection between said driving member and positioning member. This driving connection is provided for by making the arm 16 with the portion 18 to form a pawl or nose that is adapted to engage the ratchet teeth 19 formed on the face of the driving member 11. A spiral spring 20, one end of which is connected to the stud 12 and the other end of which is connected to the arm 16, tends normally to restore the positioning member to its initial position, and another spring 21 carried on the projecting end of the stem 17 and located between a collar 22 on said stem and the stud 12 tends normally to keep the pawl 18 in engagement with the ratchet 19.

The construction of my improved mechanism is such that when the driving member 11 is rotated forwardly the positioning member 16 will be carried with it because of the engagement of the pawl 18 with the ratchet teeth 19, and the positioning member will by its engagement with the pin 23 projecting from the wheel 8 serve to turn said wheel and thereby the pointer 5. At the end of the first interval of time the positioning member 16 is disconnected from the ratchet 19 and will therefore turn backwardly until it engages the stop 24, this being its initial position, but the pawl 10 will prevent the indicating member from returning and so during the second interval of time the pointer 5 will remain in the position in which it was left at the end of the first interval of time. During the second or any succeeding interval of time the positioning member, which became clutched to the driving member as soon as it reached its initial position, is again driven forward a greater or less distance depending on the speed of the driving member, and at the end of such second or any succeeding interval of time the pawl 10 is first retracted thereby to permit the indicating member to return toward its zero position as far as is permitted by the position of the positioning member, and then said pawl is thrown back into locking engagement with the wheel 8 and the positioning member is released and allowed to return to its initial position.

It will be seen from the above that in my invention the driving member is rotated continuously in a forward direction, that is to say, its rotation is always in the same direction although the movement is not continuous but is intermittent. It will also be noted that the means for clutching the positioning member to the driving member is a mechanical means which is operative in any relative position of the driving member and positioning member to establish a positive driving connection between said members. This makes the device extremely accurate in its operation, for there can be no slip between the driving member and the positioning member, and the fact that the driving member is continuously rotated in a forward direction although with an intermittent motion makes it possible to operate the device with greater accuracy than if the driving member returned to zero position each time that the instrument was set. In the illustrated embodiment of my invention this operation of releasing the positioning member and indicating member at the end of the interval of time is accomplished by a clock mechanism which is actuated by a spring that is wound up by rotation of the driving member and which, therefore, requires no special attention. My device is so constructed that as soon as the driving member begins its turning movement the time mechanism will be automatically wound and started in operation, and the continued movement of the driving member will keep the time mechanism wound so that the releasing of the indicating and positioning members will be accomplished at the appropriate intervals.

The time mechanism herein illustrated is in the form of an escapement which is operated by a spring 25 that is wound up by the rotation of the driving member 11. One end of the spring 25 is fast to the hub 26 of the driving member and the other end of the spring is received within a barrel or drum 27 that is integral with a gear wheel 28 that is mounted on the stud 12. The spring has frictional engagement only with the interior of the drum 27 and this frictional engagement is sufficient to communicate motion from the spring when it is wound up to the gear 28, but if the spring becomes wound up beyond a certain point, it will slip in the barrel 27 and thus prevent any damage. This is necessary because the driving member will rotate faster or slower depending on the speed of the machine with which the instrument is used, but the time mechanism is designated to operate at a regular speed so that this yielding connection between the spring 25 and the drum 27 is essential.

The gear 28 meshes with and drives a pinion 29 on a shaft 30, and said shaft has thereon a gear 31 which meshes with and drives a pinion 32 on the shaft 33 carrying an escapement wheel 34 of some suitable construction. This escapement has associated therewith an escapement lever 35 which is operated in usual manner by a balance wheel 36 sustained on the shaft 37. This balance wheel shaft is provided with two hair springs 38, 39, which are wound oppositely and I find that this is of importance because it insures that the device will start up automatically as soon as the winding of the spring 25 begins.

Figure 7:
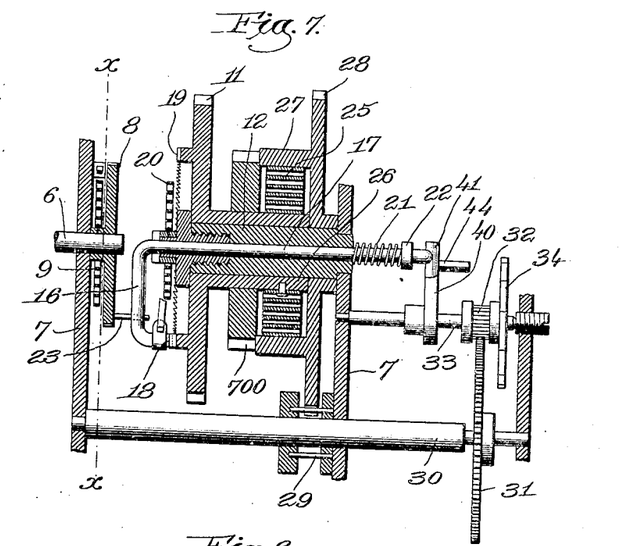
Fig. 7 is an enlarged view on substantially the line $y$—$y$, Fig. 5.

The shaft 33 carries a cam member 40 which operates both to release the pawl 10 at the proper time and also to release the positioning member from the driving member. To accomplish the releasing of the positioning member from the driving member, this cam 40 is provided with a cam surface 41 which is adapted to engage the projecting end of the stem 17 as the cam rotates and thus forces said stem to the left Fig. 7 sufficiently to disengage the nose 18 from the ratchet 19. In order that the cam 40 may release the pawl 10 I have mounted said pawl on a spring-pressed shaft 42 which is journaled in the frame 7 and which carries an arm 43 situated to be engaged by a pin 44 extending from the cam 40 as the shaft 33 rotates so that the arm 43 will be raised thereby rocking the shaft 42 and disengaging the pawl 10 from the wheel 8. The parts are so arranged that the projection 44 will engage the arm 43 thereby releasing the pawl 10 just before the cam surface 41 operates on the stem 17 to disengage the pawl 18 from the ratchet 19, and as a result at the end of any interval of time the indicating member will first be permitted to return to a position determined by the position of the positioning member 16, and when the indicating member is locked in this position, the positioning member is immediately released and allowed to return to its initial position.

The time mechanism may be designed so that the shaft 33 will rotate at any desired speed. In the mechanism herein shown it will make one rotation at every five seconds, in which case the indicating member will be set at the end of every five-second period, but it will be obvious that by suitable gearing the time mechanism might be arranged so that the releasing member 40 will make a complete rotation for any desired interval.

The above-described time mechanism is operating only when the indicator is in use, for when the operating lever 14 ceases its movement, the spring 25 will cease to be wound up and the time mechanism will stop as soon as the spring has run down. The construction is such, however, that the spring 25 will not run down until after the indicating mechanism has been set to zero. As soon as the indicator is started in operation the time mechanism will immediately begin to operate. I find that the use of two hair springs wound oppositely is of material assistance in insuring that the time mechanism will start up automatically as soon as the spring 25 is wound.

Figures 8, 13, 14:
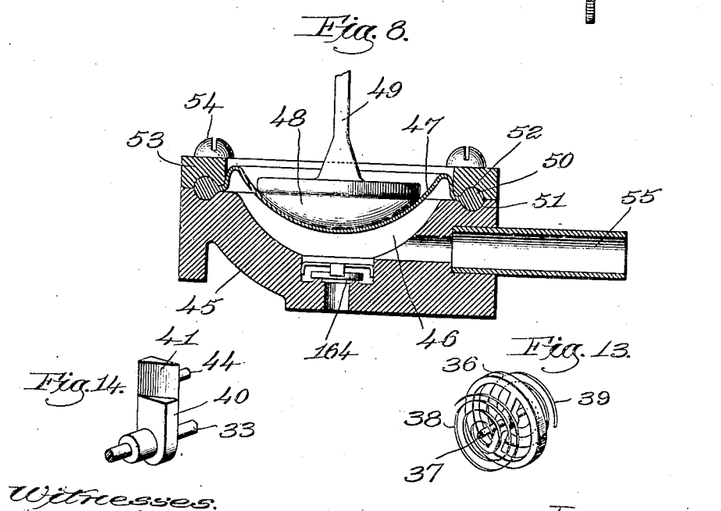
Fig. 8 is a sectional view through one of the pneumatics by which the device is operated.
Fig. 13 is a detail view showing the hair springs for operating the balance wheel.
Fig. 14 is a detail view of the cam for releasing the indicating member.
Figure 9:
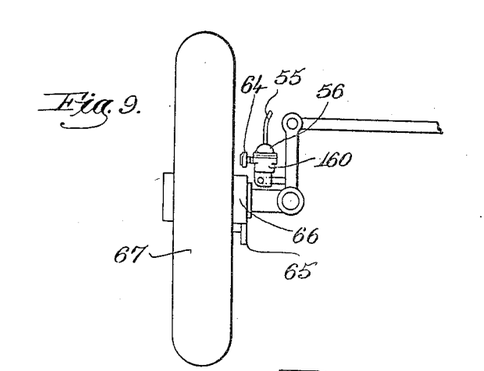
Fig. 9 is a view showing the position of the other pneumatic which is associated with the wheel of the automobile.
Figure 10:
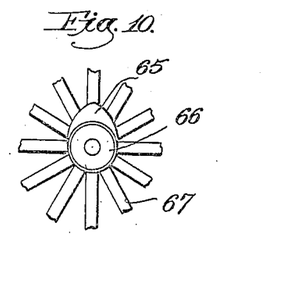
Fig. 10 is a view of the hub of the wheel showing the actuating cam thereon.
Figure 11:
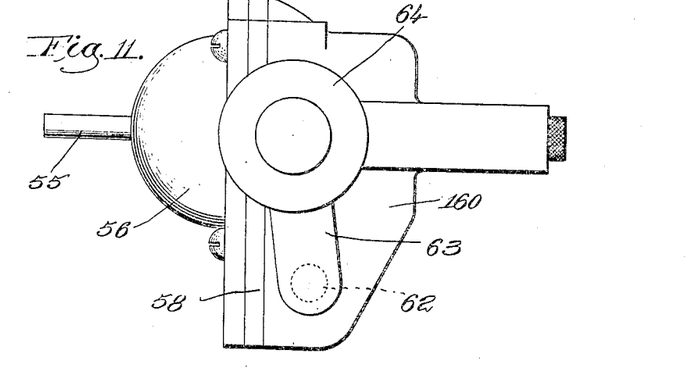
Fig. 11 is an enlarged view of the pneumatic shown in Fig. 9.

The operating lever 14 may be given its movement from the part the speed of which is to be determined by any suitable device. I find, however, that there are many advantages in using a pneumatic device for this purpose and I have, therefore, illustrated a device of this nature in the drawings. The pneumatic device may be one which will operate by air under pressure or by suction. The construction shown is one which is adapted to operate by air under pressure, but the use of suction would merely involve a reversal of movement of some parts. In the construction herein shown the lever is actuated in one direction by a spring 175 and in the other direction pneumatically, and I employ one pneumatic which is adapted to act directly on said lever, and another pneumatic which is associated with the rotating part, the speed of which is to be determined, which in the illustrated embodiment of my invention is an automobile wheel. These two pneumatics are connected by an air tube and are so arranged that when the pneumatic at the wheel is compressed the pneumatic at the instrument will be inflated, thus actuating the lever 14. The pneumatic at the instrument is shown in Fig. 8 and it comprises a box 45 having an air chamber 46 therein which is closed by a diaphragm 47 that bears against a foot 48 depending from the arm 49 of the lever 14, so that when the pneumatic is inflated the lever will be raised. The diaphragm 47 may be of any suitable material, but I will preferably use rubber, and this diaphragm is made with a thick rim portion 50 which is confined in half grooves 51, 52 formed in the block 45 and the retaining ring 53 respectively. The retaining ring is clamped to the block by suitable screws 54 and serves to firmly hold the thickened rim portion in the grooves. This rim portion is normally slightly larger than the grooves, and by being clamped therein as shown, a perfectly tight joint will be made. The air chamber 46 is connected by a flexible pipe 55 to the other pneumatic which is associated with the wheel and which is of a construction similar to that of the pneumatic just described. The pneumatic associated with the wheel is illustrated in Figs. 9 to 12 and comprises a chambered body 56 having a half groove 57 formed in the rim thereof, a clamping ring 58 also having a half groove formed therein, and the diaphragm 59 which may be of rubber or any other flexible material and which has the enlarged rim 60 adapted to be received and clamped within the half grooves.

Figure 12:
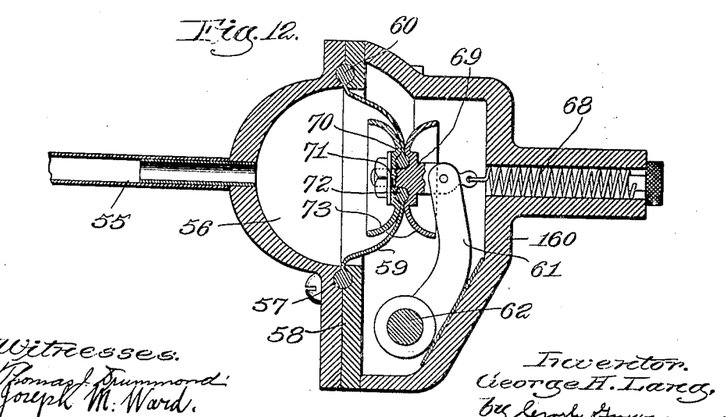
Fig. 12 is a sectional view of said pneumatic.

Mechanism is provided for moving the diaphragm 59 to the left Fig. 12 each time that the wheel rotates thereby to send an air impulse through the pipe 55 into the pneumatic 46. In the embodiment herein shown the diaphragm 59 is connected to an arm 61 fast on a rock shaft 62 that is journaled in the member 160 and that has another arm 63 thereon carrying a roll 64 that is adapted to be actuated by a cam 65 carried by the hub 66 of the wheel 67. With this construction each time that the wheel rotates the cam 65 will act on the roll 64 and thus rock the shaft 62 and move the diaphragm 59 to the left Fig. 12, as above described. A spring 68 connected to the arm operates to restore the parts to their normal position, as shown in Fig. 12. The cam 65 is so arranged that the device will be operated both when the wheel rotates forwardly and when it rotates backwardly, although this is not essential. For connecting the arm 61 to the diaphragm I have employed the construction shown in Fig. 12 in which the arm has pivoted thereto a clamping member 69 having a half groove therein and provided with a stem 71 to which is secured a second clamping member 70 also having a half groove therein. The diaphragm 59 is provided with a central aperture through which the stem 71 extends and at the edge of the aperture the diaphragm is thickened, as at 72, to form a rib which is received in the half grooves, this rib being large enough to form an absolutely tight joint at this point. Each of the clamping members is provided with the curved shield or guard 73 which prevents any sharp folds from being formed in the diaphragm as the device is in operation.

I have also associated with the indicating device above described two counting mechanisms, one of which is adapted to indicate the total number of miles traveled and the other of which is adapted to be adjusted to zero position at any desired time to indicate the number of miles traveled on any particular journey. For actuating these counting mechanisms, I have provided a gear wheel 700 fast on the hub 26 of the driving member 11 and meshing with and driving a gear 710 on a shaft 720. This shaft 720 carries a member 730 having one tooth which is adapted to intermittently rotate a gear 74 having ten teeth so that the gear 74 makes one revolution for every ten revolutions of the member 730. This gear 74 has a member 75 fast therewith also provided with one tooth which intermittently rotates the first gear 76 of a train of gearing by which a counter 77 of any suitable or usual construction is operated, this counter comprising a plurality of disks imprinted to indicate units, tens, hundreds, thousands, etc., and connected together with the usual gearing. The figures on these disks are visible through apertures 80 in the dial 4, as seen in Fig. 1. The other counter is shown as comprising three numbered disks 81 only and the first disk is operated by the member 730 so that said member will rotate ten times as fast as the first disk of the counter 77. The second counter, therefore, is arranged to indicate units and tenths of the unit, and in the embodiment shown both indicators would preferably be numbered or lettered to indicate miles. I have provided means for setting this latter counter to zero at any desired time, and for this purpose the shaft 82 of each of the disks has fast thereon a ratchet wheel 83 provided with a space 84 where one tooth is missing.

Figures 3, 4, 15:
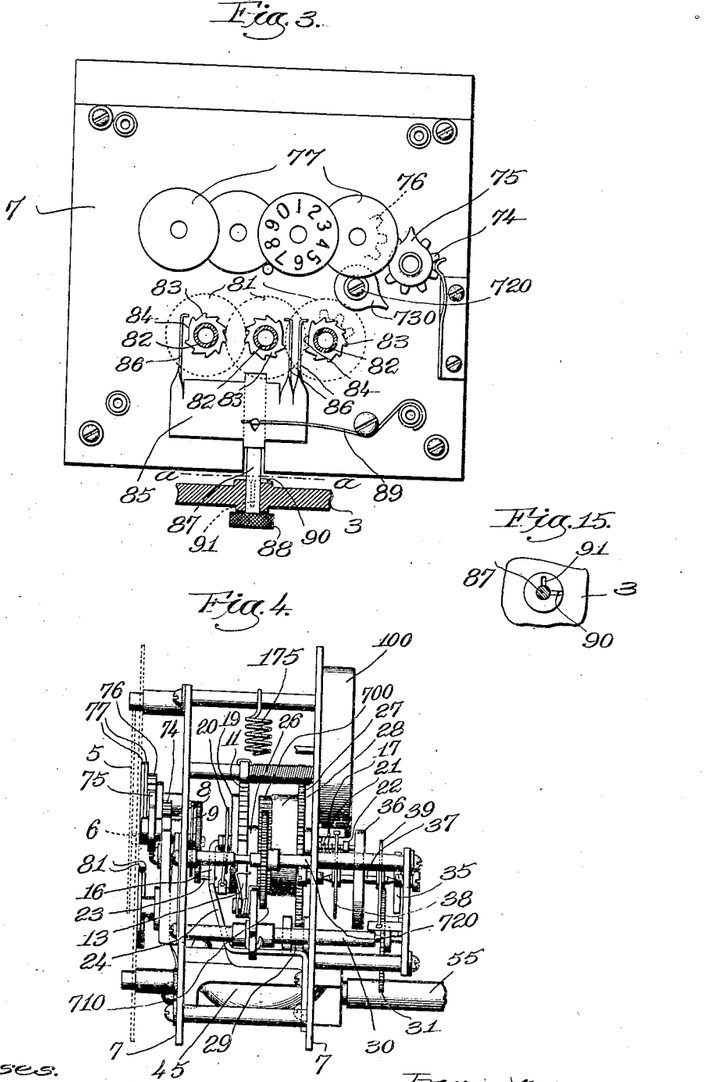
Fig. 3 is a front view of the indicating mechanism removed from the casing.
Fig. 4 is a side view thereof.
Fig. 15 is a section on the line $a$—$a$, Fig. 3.

85 is a restoring device which is in the form of a plate provided with toothed arms or pawls 86 adapted to engage the ratchet wheels 83. This restoring device 85 has swiveled thereto a stem 87 which extends through the casing 3 and is provided with a thumb-piece 88 on its end by which it may be operated. The restoring device is acted on by a spring 89 which tends normally to throw it into the dotted line position Fig. 3. The stem 87 has extending therefrom a pin 90 which normally rests on the inside of the casing 3, as shown in Fig. 3, and thus holds the restoring device elevated, but the casing is provided with a slot 91 to receive the pin when the stem 87 is turned so as to bring the pin into alinement with the slot. When this is done the restoring device can be raised and lowered thereby to ratchet the disks 81 around to zero position. The flat places 84 of the ratchet wheels are so placed that they come into the position illustrated in Fig. 3 when the disks are at their zero position, and when the ratchets are thus placed continued vibrating movement of the restoring device 85 will have no effect on the ratchet wheel. This makes a simple device for restoring the counter to zero position so that the exact number of miles traveled on any particular journey can be indicated, as well as the total number of miles traveled since the first-described counter was set at zero. After the counter 81 has been set at zero, the restoring device 85 is locked in its inoperative position, as shown in Fig. 3.

When my improved device is used in connection with automobiles, the disks or dials of the counting devices will preferably be graduated to indicate miles, but if the speed indicator is used for indicating the speed of a shaft or an engine, or of any other shaft, these counting devices could be graduated in any desired way without departing from the invention.

I have shown at 100 a watch or clock movement which may be secured to the frame and which may operate hands 101 that move over a dial 102 arranged on the face of the dial 4, so that the time of day can be shown as well as the speed and the number of miles traveled.

I have further provided herein for automatically keeping a sufficient quantity of air in the pneumatics by means of a check valve 164 in the pneumatic 45 which is so arranged that it will open inwardly.

It is not essential to my invention that the time mechanism should be driven by the indicator-actuating mechanism, but I prefer this construction as it is simpler than one in which a separate clock mechanism is employed for this purpose.

By the use of the term means to rotate the driving member continuously in a forward direction, or a similar expression, as occurring in the claims, I refer to the fact that the driving member always rotates in the same direction. The actual movement of the driving member is, of course, intermittent, but it always rotates forwardly and does not return to zero position each time that the device is set. The movement of the driving member, however, might be a continuous movement instead of an intermittent movement without affecting in any way the operation of the device or deviating from the principle of the invention, the question as to whether this movement is continuous or intermittent depending on the particular character of the means for transmitting motion from the part the speed of which is to be determined to the driving member.

Various changes in the constructional details of the parts may be made without departing from my invention.

Having fully described my invention, what I claim as new and desire to secure by Letters Patent is:—

1. In a speed indicator, the combination with a driving member, of means operated by the element the speed of which is to be determined to give it an intermittent rotary movement continuously in the same direction, an indicating member, a positioning member, mechanical means for clutching positively the positioning member to the driving member whereby the positioning member is driven forward by the driving member, said means being operative in any relative position of the positioning and driving members, springs tending normally to rotate the indicating member and the positioning member backwardly to their initial positions, a lock to prevent backward movement of the indicating member, and time-controlled means operative at predetermined time intervals to release the lock momentarily while the positioning member is still clutched to and moved forward by the driving member thereby permitting the indicating member to move backwardly and assume a position determined by the positioning member and after said lock is operative again then to release the positioning member from the continuously-rotating driving member thereby to permit said positioning member to return to its initial position, said lock holding the indicating member in indicating position until it is again released.

2. In a speed indicator, the combination with a driving member, of means operated by the element the speed of which is to be determined to give said driving member an intermittent rotary movement continuously in the same direction, an indicating member, a positioning member, mechanical means operative in any relative position of the positioning member and driving member to establish a positive driving connection between the driving member and positioning member, springs tending normally to rotate the indicating member and the positioning member backwardly to their initial positions, a lock to prevent backward movement of the indicating member, time-controlled means operative at predetermined time intervals to release the lock momentarily while the positioning member is still clutched to and moved forward by the driving member thereby permitting the indicating member to assume a position determined by the positioning member and after said lock is operative again to release the positioning member from the driving member thereby to permit said positioning member to return to its initial position, and automatically-operative means to connect the positioning member with the driving member when it returns to its initial position.

3. In a speed indicator, the combination with a rotary driving member, of a positioning member comprising a stem extending axially through the driving member and having a laterally-extending arm, means for causing the driving member to rotate the positioning member, an indicating member adapted to be rotated by the positioning member, a spring tending normally to return the indicating member to zero position, a lock to prevent backward movement of the indicating member, and means operative at predetermined intervals of time to release momentarily said lock thereby permitting the indicating member to assume a position determined by that of the positioning member and after said lock is operative to act against the stem and disconnect the positioning member from the driving member, and a spring to return the positioning member to its initial position.

4. In a speed indicator, the combination with a driving member having ratchet teeth, of a positioning member comprising a stem extending axially through the driving member and provided with a laterally-extending arm having a nose to engage said ratchet wheel, a spring holding said nose yieldingly in engagement with said ratchet teeth, means tending to return the positioning member to initial position, an indicating member operated by the positioning member, a spring tending to return the indicating member to zero position, a lock to prevent backward movement of the indicating member, and means operative at predetermined intervals of time to release momentarily the lock for the indicating member thereby permitting it to assume a position determined by that of the positioning member and then to act against the stem and release the indicating member from the driving member thereby permitting said indicating member to return to its initial position.

5. In a speed indicator, the combination with a continuously-rotating driving member having ratchet teeth on its side face, of an indicating member, a positioning member in the form of a rod or stem extending axially through the driving member and having a laterally-bent portion to engage the indicating member and a nose to engage the ratchet teeth, a spring tending to rotate the positioning member and indicating member backwardly to their zero positions, a spring for yieldingly holding the nose of the positioning member in engagement with the ratchet teeth, a lock to prevent backward movement of the indicating member, and time-controlled means to release the lock momentarily thereby permitting the indicating member to move backwardly and to assume a position determined by the positioning member and thereafter to move the stem longitudinally to release the positioning member from the driving member.

6. In a speed indicator, the combination with a continuously-rotating driving member having ratchet teeth, of a positioning member in the form of a rod or stem extending axially through the driving member and provided with a nose to engage the ratchet teeth, a spring to yieldingly hold said nose in engagement with the ratchet teeth, an indicating member positioned by the positioning member, springs tending normally to return the indicating and positioning members to their zero positions, a lock for the indicating member, and a rotatable time-controlled means acting first to release the lock of the indicating member and then to move the positioning member longitudinally to disengage it from the driving member.

7. In a speed indicator, the combination with a continuously-rotating driving member having ratchet teeth, of a positioning member in the form of a rod extending axially through the driving member and having a nose to engage said ratchet teeth, an indicating member positioned by the positioning member, springs tending normally to return the indicating and positioning members to their zero positions, a lock to prevent backward rotation of the indicating member, a rock shaft carrying said lock, and a time-controlled rotatable member to engage said rock-shaft thereby to release said lock at predetermined time intervals, said means also acting to disengage the positioning member from the ratchet teeth.

8. In a speed indicator, the combination with a continuously-rotating driving member, of a positioning member in the form of a rod extending axially through the driving member, an indicating member positioned by the positioning member, means to drive the positioning member forward by the driving member, and a rotatable time-controlled releasing member to engage the end of the rod at predetermined time intervals and move the latter lengthwise to thereby disengage it from the driving member.

9. In a speed indicator, the combination with a continuously-rotating driving member, of a positioning member, mechanical means operative in any relative position of the driving member and positioning member to establish a positive driving connection between said members, an indicating member positioned by the positioning member, time mechanism for releasing the positioning member from the driving member at predetermined time intervals, means for driving the time mechanism.

10. In a speed indicator, the combination with a stud, of a driving member loosely mounted thereon, means actuated by the part the speed of which is to be determined to give said driving member a continuous forward rotation, an indicating member mounted co-axially with the driving member, means to set the indicating member at predetermined intervals of time to indicate the speed of the driving member at such interval, time mechanism to govern the length of such interval of time, and means for operating the time mechanism comprising a spring drum loosely mounted on the stud, a spring within the drum and having frictional engagement therewith, and means connecting said spring rigidly with the driving member.

11. In a speed indicator, the combination with a continuously-rotating driving member, of a positioning member, means operative in any relative position of the driving member and positioning member to clutch the latter to the former, an indicating member positioned by the positioning member, time mechanism, mechanical means operated by the time mechanism for moving the positioning member at predetermined time intervals and disengaging it from the driving member, and a spring to return the positioning member to zero position when released.

12. In a speed indicator, the combination with a continuously-rotating driving member, of an indicating member, a positioning member, mechanical means operative in any relative position of the driving member and positioning member to establish a positive driving connection between the driving member and the positioning member, springs tending normally to rotate the indicating member and positioning member backwardly to their initial positions, a lock acting normally to prevent backward movement of the indicating member, time mechanism, and mechanical means operated by the time mechanism to release the lock momentarily at predetermined time intervals thereby permitting the indicating member to assume a position determined by the positioning member and after said lock is operated again then to move the positioning member away from the driving member and release it therefrom thereby permitting the positioning member to return to zero position.

13. In a speed indicator, the combination with a rotary driving member, of an indicating member, a positioning member situated on one side of the driving member in axial alinement therewith, mechanical means to establish a positive driving connection between the driving member and positioning member, springs tending normally to rotate the positioning member and indicating member backwardly to their zero positions, a lock acting normally to prevent backward rotation of the indicating member, and time-controlled means situated on the opposite side of the driving member from the positioning member and operative at predetermined time intervals to first release said lock and then to release the positioning member from the driving member.

14. In a speed indicator, the combination with a rotary driving member, of an indicating member, a positioning member situated on one side of the driving member in axial alinement therewith, means to drive the positioning member forwardly by the driving member, springs tending normally to return the indicating member and positioning member to their zero positions, a time-controlled releasing member situated on the opposite side of the driving member from the positioning member, and operative mechanical connections between the releasing member and the positioning member extending axially through the driving member whereby the positioning member is released from the driving member at predetermined time intervals.

15. In a speed indicator, the combination with a rotary driving member, of pneumatic means to rotate said member continuously in a forward direction, a positioning member, mechanical means to establish a positive driving connection between the driving member and the positioning member, an indicating member, means tending normally to return the positioning and indicating members to zero position, a lock to restrain backward movement of the indicating member, time mechanism, and mechanical connections between said time mechanism and the lock and positioning member to release the lock momentarily at predetermined time intervals thereby permitting the indicating member to assume a position determined by the positioning member and after said lock is operative again to release the positioning member from the driving member.

16. In a speed indicator, the combination with a driving member, of means to rotate said member continuously in a forward direction, of a positioning member, means to establish a positive mechanical driving connection between the driving member and the positioning member, an indicating member, time mechanism, mechanical means operated by the time mechanism at predetermined intervals to set the indicating member to a position determined by the positioning member and thereafter to shift the position of the positioning member to disengage it from the driving member, and a spring to return the positioning member to zero position when thus disengaged.

17. In a speed indicator, the combination with a driving member, of pneumatic means to rotate said driving member continuously in a forward direction, a positioning member, means operative in any relative position of the driving member and positioning member to clutch the latter to the former, an indicating member positioned by the positioning member, time mechanism, mechanical means operated by the time mechanism for moving the positioning member at predetermined time intervals and disengaging it from the driving member, and a spring to return the positioning member to zero position when released.

18. In a speed indicator, the combination with a continuously-rotating driving member, of a positioning member, mechanical means operative in any relative position of the driving member and positioning member to establish a positive driving connection between them, an indicating pointer, a fixed dial over which said pointer moves, and means operative at predetermined time intervals first to set the indicating pointer to a position determined by the positioning member and then to release said positioning member from the driving mechanism and return it to zero position.

In testimony whereof, I have signed my name to this specification, in the presence of two subscribing witnesses.

GEORGE H. LANG.

Witnesses:
 LOUIS C. SMITH,
 THOMAS J. DRUMMOND.